United States Patent
Murata

(10) Patent No.: US 10,345,917 B2
(45) Date of Patent: Jul. 9, 2019

(54) OPERATION DEVICE

(71) Applicant: KABUSHIKI KAISHA TOKAI RIKA DENKI SEISAKUSHO, Aichi (JP)

(72) Inventor: Kenji Murata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 47 days.

(21) Appl. No.: 15/740,376

(22) PCT Filed: Jun. 21, 2016

(86) PCT No.: PCT/JP2016/068343
§ 371 (c)(1),
(2) Date: Dec. 28, 2017

(87) PCT Pub. No.: WO2017/010241
PCT Pub. Date: Jan. 19, 2017

(65) Prior Publication Data
US 2018/0188821 A1 Jul. 5, 2018

(30) Foreign Application Priority Data
Jul. 13, 2015 (JP) .................................. 2015-139620

(51) Int. Cl.
G05G 5/03 (2008.04)
G06F 3/02 (2006.01)
(Continued)

(52) U.S. Cl.
CPC ............. G06F 3/0202 (2013.01); G05G 5/03 (2013.01); G06F 3/02 (2013.01); G06F 3/041 (2013.01);
(Continued)

(58) Field of Classification Search
CPC .... H02P 1/00; H02P 7/281; H02P 1/24; H02P 1/18; H02P 1/26; H02P 6/00; H02P 6/005;
(Continued)

(56) References Cited

U.S. PATENT DOCUMENTS 6,404,158 B1 * 6/2002 Boisvert ................ B60J 7/0573
318/466
8,981,682 B2 * 3/2015 Delson .................... A63F 13/06
318/114

FOREIGN PATENT DOCUMENTS

WO 2008068541 A1 6/2008

OTHER PUBLICATIONS

International Search Report issued in a corresponding application No. PCT/JP2016/068343 dated Aug. 9, 2016.

* cited by examiner

Primary Examiner — Antony M Paul
(74) Attorney, Agent, or Firm — Roberts Mlotkowski Safran Cole & Calderon P.C.

(57) ABSTRACT

An operation device includes a motor capable of forward and reverse rotation, a transmission mechanism configured to convert forward and reverse rotation of the motor into linear ascending and descending motion and to provide tactile stimulation on an operation unit, and a controller configured to control switching of an energizing direction of the motor. The controller is configured to control acceleration such that an amount of ascending movement of the operation unit is increased by increasing driving power in a forward rotation direction of the motor, and to control deceleration such that the ascending movement of the operation unit decelerates by supplying driving power in a reverse rotation direction of the motor, in a predetermined time from (Continued)

when the operation unit starts the ascending movement via the transmission mechanism until a target displacement amount is reached.

5 Claims, 2 Drawing Sheets

(51) Int. Cl.
    *H01H 3/00*           (2006.01)
    *H02P 7/06*           (2006.01)
    *G06F 3/041*          (2006.01)
    *H02P 7/281*         (2016.01)

(52) U.S. Cl.
    CPC .............. *G06F 3/0414* (2013.01); *H02P 7/06* (2013.01); *H02P 7/281* (2013.01); *G06F 2203/014* (2013.01); *H01H 2003/008* (2013.01)

(58) Field of Classification Search
    CPC .......... H02P 6/006; H02P 6/008; H02P 23/00; H02P 27/00; H02P 27/026; H02P 2205/07; G06F 3/0202; G06F 2203/014; G06F 3/0414; G05G 5/03; H01H 2003/008
    USPC ....... 318/256, 257, 259, 260, 262, 263, 266, 318/268, 270, 276, 280, 282, 286, 466, 318/119, 135, 400.01, 700, 400.1, 701, 318/727, 779, 799, 721
    See application file for complete search history.

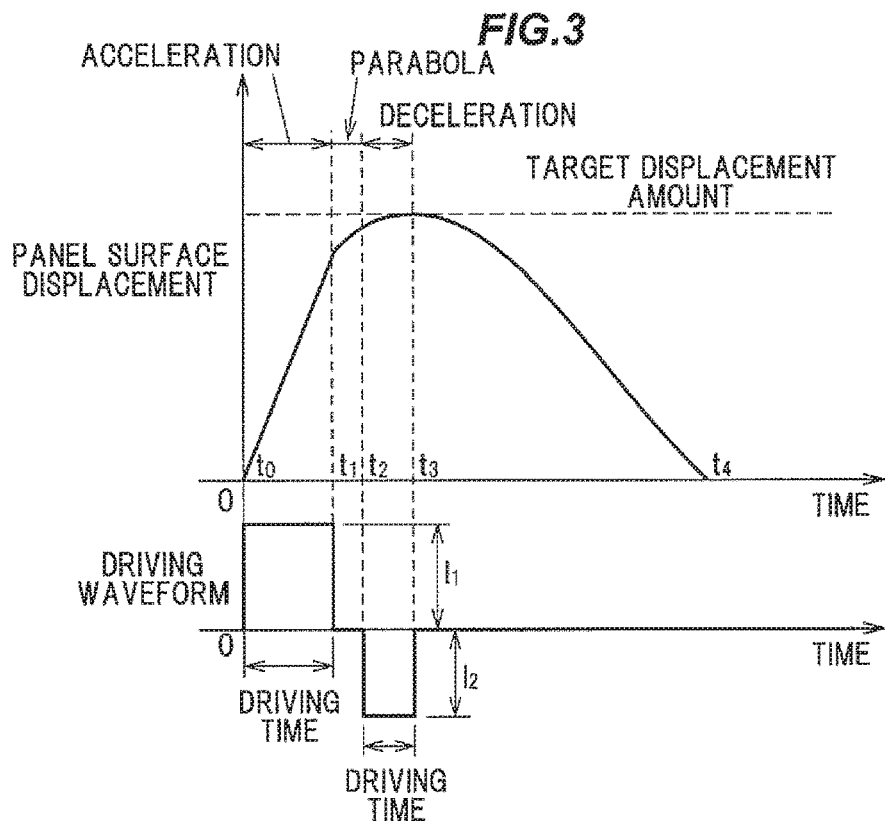

OPERATION DEVICE

CROSS-REFERENCE TO RELATED APPLICATIONS

The present application is a U.S. National Phase of PCT/JP2016/068343 filed on Jun. 21, 2016 claiming priority to Japanese Patent Application No. 2015-139620 filed on Jul. 13, 2015. The disclosure of the PCT Application is hereby incorporated by reference into the present Application.

TECHNICAL FIELD

The present invention relates to operation devices, and particularly relates to an operation device having a function of providing tactile stimulation (feedback force) to an operator.

BACKGROUND ART

As an example of an operation device in the related art, a direction presentation device is known that, for example, present a direction using an inclination of a finger of an operator (for example, see Patent Document 1).

In the direction presentation device in the related art, disclosed in Patent Document 1, a finger placing plate is disposed on the upper surfaces of a plurality of movable panels capable of moving independently and vertically, and is configured to incline in correspondence with the direction of travel displayed on a screen by a vehicle navigation device.

A rack and pinion structure in which a rack formed protruding downward of each of the movable panels is engaged with a pinion fixed to the output shaft of a motor is used as an example of a movable part for driving the movable panel.

CITATION LIST

Patent Literature

Patent Document 1: JP 2010-204741 A

SUMMARY OF INVENTION

Technical Problem

In this type of operation device, the displacement amount of the panel surface height of the movable panel can be adjusted by flowing driving current through the motor in a forward rotation direction.

As illustrated in FIG. 4, while driving current is flowing through the motor in the forward rotation direction, the panel surface height is displaced in a linearly accelerating manner. However, after the driving current stops, the panel surface height can only reach a target panel surface height by being displaced in such a non-linear manner that a parabola is drawn with the speed immediately before the stop of the driving current being an initial velocity, on the basis of rotary motion through inertia of the motor.

In this method, in which current flows through the motor only in the forward rotation direction, time from when the panel surface height starts displacing until when the target displacement amount is achieved (hereinafter also referred to as rise time) is determined to be fixed. Thus, it is desired that tactile stimulation is provided in a short time by adjusting the rise time.

As indicated by the chain double-dashed line in FIG. 4, the rise time can be shortened by extending acceleration time for accelerating the ascending speed of the panel surface. Unfortunately, as the rise time becomes shorter, the displacement amount of the panel surface height becomes greater than the target displacement amount because of inertia of the motor after the stop of the driving current. Accordingly, the displacement amount of the panel surface cannot remain within a required limit only by shortening the rise time.

An object of the invention is to provide an operation device capable of providing tactile stimulation in a short time.

Solution to Problem

[1] An operation device according to an embodiment of the invention includes: a motor capable of forward and reverse rotation; a gear mechanism configured to convert forward and reverse rotation of the motor into linear ascending and descending motion and to provide tactile stimulation on an operation unit; and a controller configured to control switching of an energizing direction of the motor. The controller is configured to control acceleration such that an amount of ascending motion of the operation unit is increased by increasing driving power in a forward rotation direction of the motor, and to control deceleration such that the ascending motion of the operation unit decelerates by supplying driving power in a reverse rotation direction of the motor, in a predetermined time from when the operation unit starts the ascending motion via the gear mechanism until a target displacement amount is reached.

[2] In the aspect described in [1], the controller may be configured to control the motor such that a ratio of acceleration time for accelerating an ascending speed of the operation unit during forward rotation of the motor and deceleration time for decelerating the ascending speed of the operation unit during reverse rotation of the motor remains within the predetermined time.

[3] In the aspect described in [1] or [2], the driving power in the forward rotation direction of the motor may be increased by extending driving time of the motor.

[4] In the aspect described in [1] or [2], the driving power in the forward rotation direction of the motor may be increased by increasing driving current of the motor.

[5] In any one of the aspects described in [1] to [4], the operation unit may include a movable panel coupled to the transmission mechanism, the movable panel being driven in synchronization with the converted linear ascending and descending motion; and the movable panel may include a touch panel.

Advantageous Effects of Invention

According to an embodiment of the invention, an operation device capable of providing tactile stimulation in a short time can be provided.

BRIEF DESCRIPTION OF DRAWINGS

FIG. 3 is a schematic diagram illustrating an example of a relationship between a driving waveform of a motor and displacement of an operation panel surface by acceleration and deceleration.

FIG. 4 is a schematic diagram illustrating an example of a relationship between a driving waveform of a motor and displacement of an operation panel surface by only acceleration in the related art.

DESCRIPTION OF EMBODIMENT

Preferred embodiments of the invention will be described in detail hereinafter with reference to the appended drawings.

Embodiment

Overall Configuration of Operation Device

Figure 1:
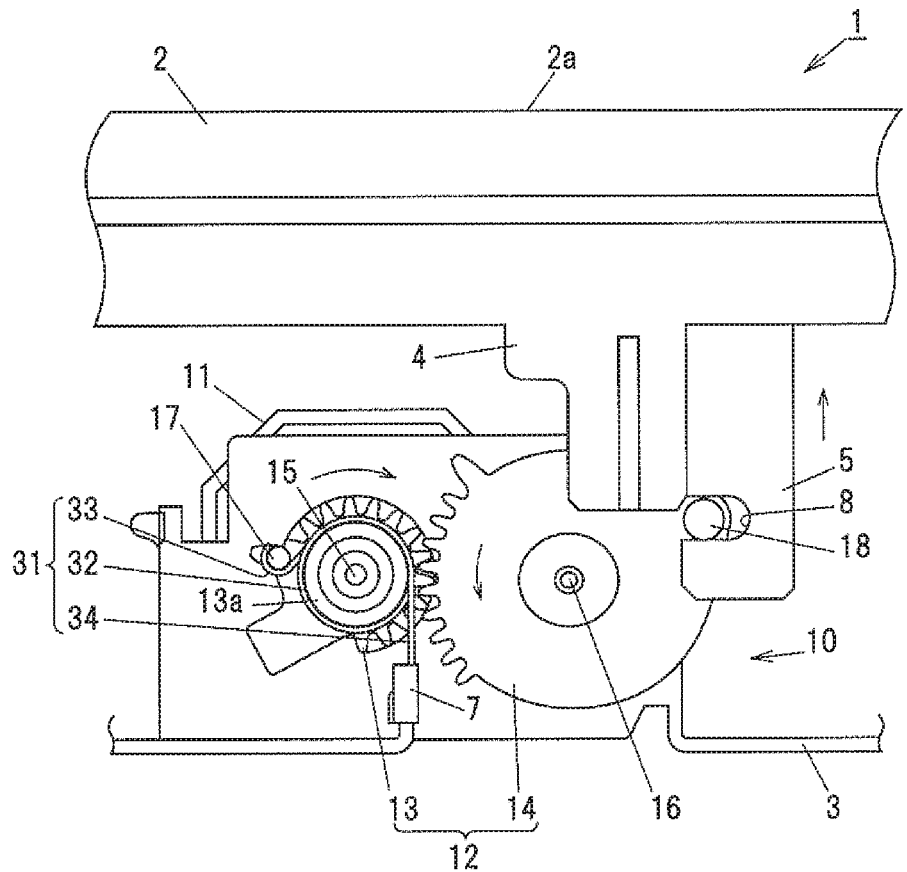
FIG. 1 is a schematic diagram illustrating an example of an operation device according to an embodiment of the invention.

FIG. 1 schematically illustrates an operation device, which is indicated as a whole by reference sign 1, including a typical power transmission mechanism according to an embodiment. The operation device 1 is disposed in the vicinity of a driver's seat, such as in a center console, and is connected to a display via a wire.

The operation device 1 is applied to, for example, a touch panel being input means that outputs input signals for controlling the operations of vehicle-mounted devices such as air conditioning devices, audio devices, and navigation devices. The operation device 1 is configured as a remote operation input device in which, when a touch operation is made on the touch panel by a finger of an operator, a touch sensor detects a location on the surface of the touch panel, and a location detection signal corresponding to that location selects and determines an item button on a display.

The operation device 1 includes a movable panel 2 being an operation unit made of resin, capable of receiving a push operation.

The movable panel 2 is supported by a body 3 via an elastic support member so as to be capable of moving linearly. On the back surface of the movable panel 2, a plurality of guide tabs 4 for guiding and movement to the inside of the body 3 extend in the push operation direction, and a long plate shaped coupling member 5 synchronizing with reciprocating linear motion of the movable panel 2 extends in a push operation direction.

The movable panel 2 is provided with, for example, an electrostatic capacitive touch panel. The body 3 disposed on the back surface side of the touch panel is provided with an enter switch for selecting and determining an item button on a display through a touch operation on an operation panel surface 2a of the movable panel 2. An example of the enter switch is an automatic restoration type microswitch.

Overall Configuration of Power Transmission Mechanism

A power transmission mechanism 10 is embedded in the body 3. The power transmission mechanism 10 has a tactile sensation feedback function that provides tactile stimulation to the finger of the operator by detecting a touch operation made on the operation panel surface 2a of the movable panel 2 by the finger of the operator. As this transmission mechanism, various transmission mechanisms can be applied that transmit driving force from a DC motor 11 to the movable panel 2 via a linkage mechanism or a cam mechanism. In the present embodiment, the power transmission mechanism 10 includes a DC motor 11 mounted on a control board and capable of forward and reverse rotation, and a gear mechanism 12 converting forward and reverse rotation of the DC motor 11 into linear ascending and descending motion and transmitting tactile stimulation (vibration) to the movable panel 2.

The gear mechanism 12 includes a drive gear 13 transmitting forward and reverse rotation of the DC motor 11 and a driven gear 14 engaging with the drive gear 13. The drive gear 13 is fixed to a motor shaft 15 being a driving shaft, whereas the driven gear 14 is fixed, in an integrally rotatable manner, to a shaft 16 being a driven shaft arranged parallel with the motor shaft 15. The shaft 16 is supported rotatably in the body 3.

The drive gear 13 is not particularly limited but is formed to have a spur gear type engaging portion not formed over the entire circumference of the gear but partially formed in an engageable range in a rotary range of the driven gear 14.

The driven gear 14 is not particularly limited but is formed to have an engaging portion not formed over the entire circumference of the gear but partially formed only in an engageable range in a rotary range of the drive gear 13. A pitch circle diameter of the driven gear 14 is set to be greater than a pitch circle diameter of the drive gear 13, and the gear ratio of the drive gear 13 and the driven gear 14 configures a speed increasing ratio.

With this configuration, motor driving force is transmitted to the movable panel 2 via the gear mechanism 12, so that appropriate setting of the gear ratio, for example, can appropriately adjust pressing up force of the movable panel 2, motor torque, rotational speed, and the like.

A coupling pin 18 protrudes in an eccentric position on a flat plate surface of the driven gear 14. The coupling pin 18 is rotatably coupled to a pin engaging hole 8 formed as a notch on a side end of the coupling member 5 of the movable panel 2. The pin engaging hole 8 is formed in a rotary path of the coupling pin 18 of the driven gear 14.

The coupling member 5 and the coupling pin 18 of the driven gear 14 are motion converting members for converting forward and reverse rotation of the DC motor 11 into linear motion of the movable panel 2. The initial position of the coupling pin 18 is preferably set on a line connecting the rotational center of the motor shaft 15 and the rotational center of the shaft 16, in correspondence with the stop position of the operation panel surface 2a of the movable panel 2 before operation.

In the power transmission mechanism 10 thus configured, rotary motion of the coupling pin 18 of the driven gear 14 engaging with the drive gear 13 is converted into linear motion of the movable panel 2 via the pin engaging hole 8 of the coupling member 5 and is transmitted, enabling the movable panel 2 to slightly move in ascending and descending directions.

Thus, slight ascending and descending motion (vibration) of the movable panel 2 via the gear mechanism 12 capable of forward and reverse rotation for generating tactile stimulation (feedback force) on the movable panel 2 can provide vertical tactile stimulation (feedback force) to the finger of the operator.

Configuration of Motor Driving Device

Rotation of the DC motor 11 is transmitted to the movable panel 2 with the gear ratio of the gear mechanism 12. Thus, while driving current is flowing through the DC motor 11 in the forward rotation direction, the height of the operation panel surface 2a of the movable panel 2 is displaced in a linearly accelerating manner as illustrated in FIG. 4. However, after the driving current stops, the height of the operation panel surface 2a can only be displaced in such a non-linear manner that a parabola is drawn with the speed immediately before the stop of the driving current being an initial velocity, on the basis of rotary motion through inertia of the DC motor 11, and time from when the height of the operation panel surface 2a starts displacing until when the target displacement amount is achieved (rise time) is determined to be fixed.

It is preferred to provide tactile stimulation to the operator in a short time by shortening the rise time. Unfortunately, as the rise time becomes shorter, the displacement amount of the height of the operation panel surface 2a increases because of inertia of the DC motor 11.

The operation device 1 according to the embodiment thus includes a motor driving device 20 that shortens time from when the operation panel surface 2a starts ascending motion until when the target displacement amount is achieved with the amount of displacement (ascending motion) of the operation panel surface 2a remaining within a required limit.

Figure 2:
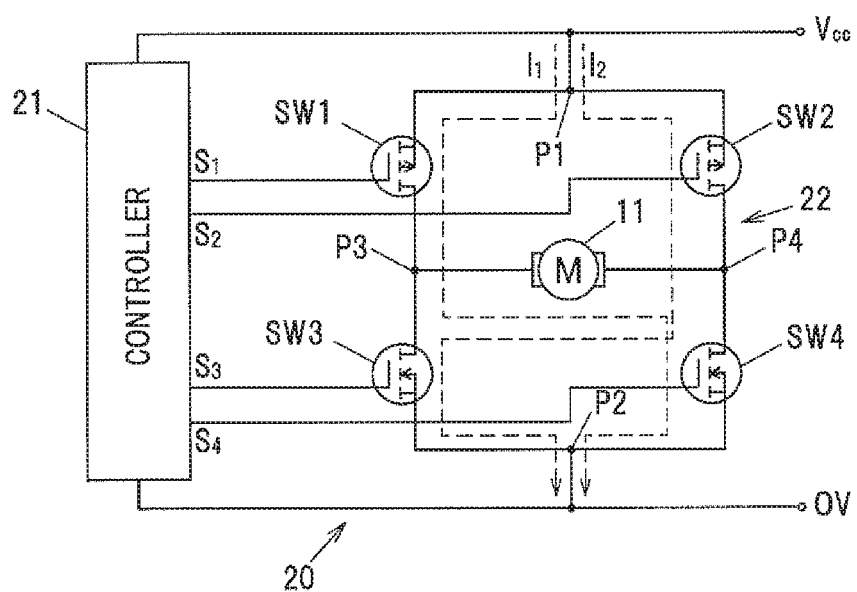
FIG. 2 is a circuit diagram illustrating an example H-bridge circuit for achieving forward and reverse rotation control.

As illustrated in FIG. 2, the motor driving device 20 controls forward and reverse rotation of the DC motor 11 to slightly move the movable panel 2 in an ascending and descending manner via the gear mechanism 12, in order to provide tactile stimulation to the operator, and includes a controller 21 controlling forward and reverse rotation of the DC motor 11 and an H-bridge circuit 22 being a forward and reverse rotation circuit for driving the DC motor 11 in response to control signals $S_1$ to $S_4$ from the controller 21.

The controller 21 is composed of a CPU performing arithmetic processing or the like to acquired data in accordance with a stored program, a RAM and a ROM being semiconductor memories, and a microcomputer composed of various components, and receives a touch signal input through a touch operation on the operation panel surface 2a of the movable panel 2 and sends the control signals $S_1$ to $S_4$ to the H-bridge circuit 22 to control the operation of the H-bridge circuit 22.

The H-bridge circuit 22 includes a first switching element SW1, a second switching element SW2, a third switching element SW3, and a fourth switching element SW4, and supplies driving current $I_1$, $I_2$ supplied from a power source Vcc on the basis of the control signals $S_1$ to $S_4$ output from the controller 21 to the DC motor 11, as current enabling forward and reverse rotation of the motor. Note that the controller 21 may have the function of the H-bridge circuit 22.

In the illustrated example, P-channel MOS-FETs are used as the first and second switching elements SW1, SW2, and N-channel MOS-FETs are used as the third and fourth switching elements SW3, SW4. The first to fourth switching elements SW1 to SW4 are bridge-connected.

An intermediate connection point P1 between the first and second switching elements SW1, SW2 is connected to the power source Vcc, and an intermediate connection point P2 between the third and fourth switching elements SW3, SW4 is connected to a ground potential 0 V. The DC motor 11 is connected between an intermediate connection point P3 between the first and third switching elements SW1, SW3 and an intermediate connection point P4 between the second and fourth switching elements SW2, SW4.

In the H-bridge circuit 22, sending the control signal $S_1$ to the first switching element SW1 and the control signal $S_4$ to the fourth switching element SW4 turns on the first switching element SW1 and the fourth switching element SW4 and turns off the second and third switching elements SW2, SW3. This control allows the driving current $I_1$ to flow through the DC motor 11 in the forward rotation direction.

Sending the control signal $S_2$ to the second switching element SW2 and the control signal $S_3$ to the third switching element SW3 turns on the second and third switching elements SW2, SW3 and turns off the first and fourth switching elements SW1, SW4. This control allows the driving current $I_2$ to flow through the DC motor 11 in the reverse rotation direction.

Sending the control signal $S_3$ to the third switching element SW3 and the control signal $S_4$ to the fourth switching element SW4 turns on the third and fourth switching elements SW3, SW4 and turns off the first and second switching elements SW1, SW2. This control applies no driving current to the DC motor 11 and can thus put brakes on the DC motor 11.

Now refer to FIG. 3, which illustrates an example of a relationship between a driving waveform of the motor and displacement of the operation panel surface by acceleration and deceleration.

When the DC motor 11 is controlled so as to rotate forward, the driving current $I_1$ flowing through the DC motor 11 in the forward rotation direction is increased to accelerate rotation of the DC motor 11. To accelerate rotation of the DC motor 11, the first and fourth switching elements SW1, SW4 are turned on, and the second and third switching elements SW2, SW3 are turned off, so that the driving current $I_1$ is supplied to the DC motor 11 in the forward rotation direction to ascend the operation panel surface 2a of the movable panel 2.

The time from a forward rotation start point to of the DC motor 11 until a lapse of predetermined time $t_1$ in FIG. 3 is set as acceleration time for accelerating the ascending speed of the operation panel surface 2a. Acceleration is controlled in this acceleration time so that the amount of displacement (ascending motion) of the operation panel surface 2a is increased. When the predetermined time $t_1$ has lapsed after the operation panel surface 2a starts ascending, the on/off of the switching elements SW1 to SW4 are switched, so that the DC motor 11 is controlled to rotate reversely instead of rotating forward.

When the DC motor 11 is switched from forward rotation to reverse rotation, the first and third switching elements SW1, SW3, for example, are turned on simultaneously, and the power source Vcc and the ground potential 0 V may cause a short circuit. To prevent this short circuit, a certain time width ($t_1$-$t_2$) is set.

When the DC motor 11 is controlled so as to rotate reversely, the driving current $I_2$ of a driver or the like flowing through the DC motor 11 in the reverse rotation direction is supplied to decelerate rotation of the DC motor 11. To decelerate rotation of the DC motor 11, the first and fourth switching elements SW1, SW4 are turned off, and the second and third switching elements SW2, SW3 are turned on. This operation allows the driving current $I_2$ to be supplied to the DC motor 11 in the reverse rotation direction to decelerate the ascending speed of the operation panel surface 2a of the movable panel 2.

The time from a reverse rotation start point $t_2$ of the DC motor 11 until a lapse of predetermined time $t_3$ in FIG. 3 is set as deceleration time for decelerating the ascending speed of the operation panel surface 2a. Displacement (ascending motion) of the operation panel surface 2a is decelerated in this deceleration time, and deceleration is controlled from when the operation panel surface 2a starts the decelerating motion until the predetermined time $t_3$ so that the target displacement amount of the operation panel surface 2a is achieved. At predetermined time $t_4$ after the predetermined time $t_3$, the height of the operation panel surface $2a$ returns to an initial position.

As illustrated in FIG. 3, the rise time ($t_0$ to $t_3$) can be adjusted by appropriately adjusting a ratio of acceleration time for accelerating the ascending speed of the operation panel surface $2a$ during acceleration of rotation of the DC motor 11 and deceleration time for decelerating the ascending speed of the operation panel surface $2a$ during deceleration of rotation of the DC motor 11.

In comparison with the case illustrated in FIG. 4 in which the displacement amount of the height of the operation panel surface of the movable panel 2 is adjusted by flowing driving current through the DC motor 11 only in the forward rotation direction, the target displacement amount of the operation panel surface $2a$ can be achieved with a shortened rise time ($t_0$ to $t_3$) by extending acceleration time for accelerating the ascending speed of the operation panel surface $2a$ and adjusting deceleration time for decelerating the ascending speed of the operation panel surface $2a$.

Configuration of Backlash Eliminating Means

In the configuration of the power transmission mechanism 10 illustrated in FIG. 1, in a case where the motor is driven to rotate forward and reversely with backlash in which tooth surfaces of the drive gear 13 and the driven gear 14 do not come into contact with each other, a clearance corresponding to the backlash fails to fix the positions. This failure causes a different engaging state of the drive gear 13 and the driven gear 14 and thus changes the positional relationship between the position in forward and reverse rotation of the gear mechanism 12 and the position in reciprocating linear motion of the movable panel 2.

As a result, a tooth portion of the drive gear 13 and a tooth portion of the driven gear 14 lose contact intermittently, failing to achieve a tactile sensation presentation device that provides the same tactile sensation by vibration to the finger of the operator. It is thus important to eliminate variations in tactile sensation due to a deviation in position of the forward and reverse rotation driving and transmission system caused by the backlash, thus preventing variations in tactile sensation by vibration to the finger of the operator.

As illustrated in FIG. 1, the above-described operation device 1 includes a torsion spring 31 as backlash eliminating means for eliminating backlash in the gear mechanism 12.

A spring hooking protrusion 17 for hooking the torsion spring 31 thereon is formed protruding in an eccentric position on a flat plate surface of the drive gear 13. A wound portion 32 of the torsion spring 31 is inserted into and held by a boss portion 13a of the drive gear 13. A first arm portion 33 extending linearly outward from one end of the wound portion 32 is hooked on the spring hooking protrusion 17 of the drive gear 13, and a second arm portion 34 extending linearly outward from the other end of the wound portion 32 is hooked on a spring hooking protrusion 7 formed on the body 3.

Urging force of the torsion spring 31 in the rotation direction can always bring tooth surfaces of the drive gear 13 and the driven gear 14 into contact with each other. This configuration eliminates backlash in the forward and reverse rotation directions between the drive gear 13 and the driven gear 14. Note that a coil spring, a leaf spring, rubber, or other elastic member may be used instead of the torsion spring 31.

Effect of Embodiments

The operation device 1 according to the embodiment configured as described above provides the following effects in addition to the above-described effects.

(1) Since the time from when the operation panel surface $2a$ starts ascending motion until the target displacement amount is achieved ($t_0$ to $t_3$) can be shortened, generation of vibration can be started promptly.

(2) Since both the speed of ascending motion of the operation panel surface $2a$ and the displacement amount of the ascending motion of the operation panel surface $2a$ can be adjusted within the time from when the operation panel surface $2a$ starts the ascending motion until the target displacement amount is achieved ($t_0$ to $t_3$), intended tactile sensation by vibration can be provided.

(3) Since backlash in the position of switching forward and reverse rotation and the stop position of the gear mechanism 12 can be eliminated, and variations in vibration due to the backlash can thus be prevented, the operation device 1 having an optimal property of providing uniform tactile sensation by vibration can be effectively achieved.

Other Modifications

A representative example of the configuration of the operation device 1 according to the invention has been described according to the embodiment, modifications, and the drawings. The following is other possible modifications.

In the above-described embodiment and the drawings, vibration feedback force is applied to the movable panel 2 via the gear mechanism 12 composed of the drive gear 13 and the driven gear 14. However, vibration feedback force may be applied to the movable panel 2 via a rack and pinion mechanism being a gear mechanism in which teeth of a rack engaging with a pinion fixed to the motor shaft 15 of the DC motor 11 are formed on the coupling member 5 of the movable panel 2. In the invention, various transmission mechanisms that transmit driving force from the DC motor 11 to the movable panel 2 via, for example, a linkage mechanism or a cam mechanism may be applied.

The operation device 1 according to the invention can also be used in other modifications described below.

(1) The operation device is not limited to a vehicle-mounted device, and can of course be applied in various types of terminal devices such as game devices, personal computers, and mobile telephones.

(2) The operation device can provide tactile stimulation to the finger of the operator even in various switch devices not including a touch panel and can also be applied to, for example, mouse devices, keyboards, and operation knobs.

(3) The number, position, form, and the like of the operation device 1 to be arranged may be selected appropriately depending on, for example, the intended purpose. The original object of the invention can be achieved.

As made clear above, the invention according to the scope of the claims is not limited by the representative embodiment, modifications, and illustrated examples according to the invention described above. As such, it should be understood that all combinations of the features described in the embodiment, modifications, and illustrated examples are not required parts of the means to solve the problems of the invention.

REFERENCE SIGNS LIST

1 OPERATION DEVICE
2 MOVABLE PANEL
2a OPERATION PANEL SURFACE
3 BODY
10 POWER TRANSMISSION MECHANISM
11 DC MOTOR
12 GEAR MECHANISM
20 MOTOR DRIVING DEVICE
21 CONTROLLER

The invention claimed is:

1. An operation device, comprising:
   a motor capable of forward and reverse rotation;
   a transmission mechanism configured to convert forward and reverse rotation of the motor into linear ascending and descending motion and to provide tactile stimulation on an operation unit; and
   a controller configured to control switching of an energizing direction of the motor,
   wherein the controller is configured to control acceleration such that an amount of ascending movement of the operation unit is increased by increasing driving power in a forward rotation direction of the motor, and to control deceleration such that the ascending movement of the operation unit decelerates by supplying driving power in a reverse rotation direction of the motor, in a predetermined time from when the operation unit starts the ascending movement via the transmission mechanism until a target displacement amount is reached.

2. The operation device according to claim 1, wherein the controller is configured to control the motor such that a ratio of acceleration time for accelerating an ascending speed of the operation unit during forward rotation of the motor and deceleration time for decelerating the ascending speed of the operation unit during reverse rotation of the motor remains within the predetermined time.

3. The operation device according to claim 1, wherein the driving power in the forward rotation direction of the motor is increased by extending driving time of the motor.

4. The operation device according to claim 1, wherein the driving power in the forward rotation direction of the motor is increased by increasing driving current of the motor.

5. The operation device according to claim 1, wherein the operation unit comprises a movable panel coupled to the transmission mechanism, the movable panel being driven in accordance with the converted linear ascending and descending motion, and
   wherein the movable panel comprises a touch panel.

* * * * *